Dec. 26, 1950 W. R. SPILLER ET AL 2,535,240
FEEDING MECHANISM
Filed Jan. 20, 1945 10 Sheets-Sheet 1
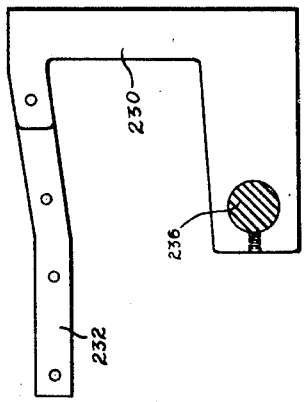
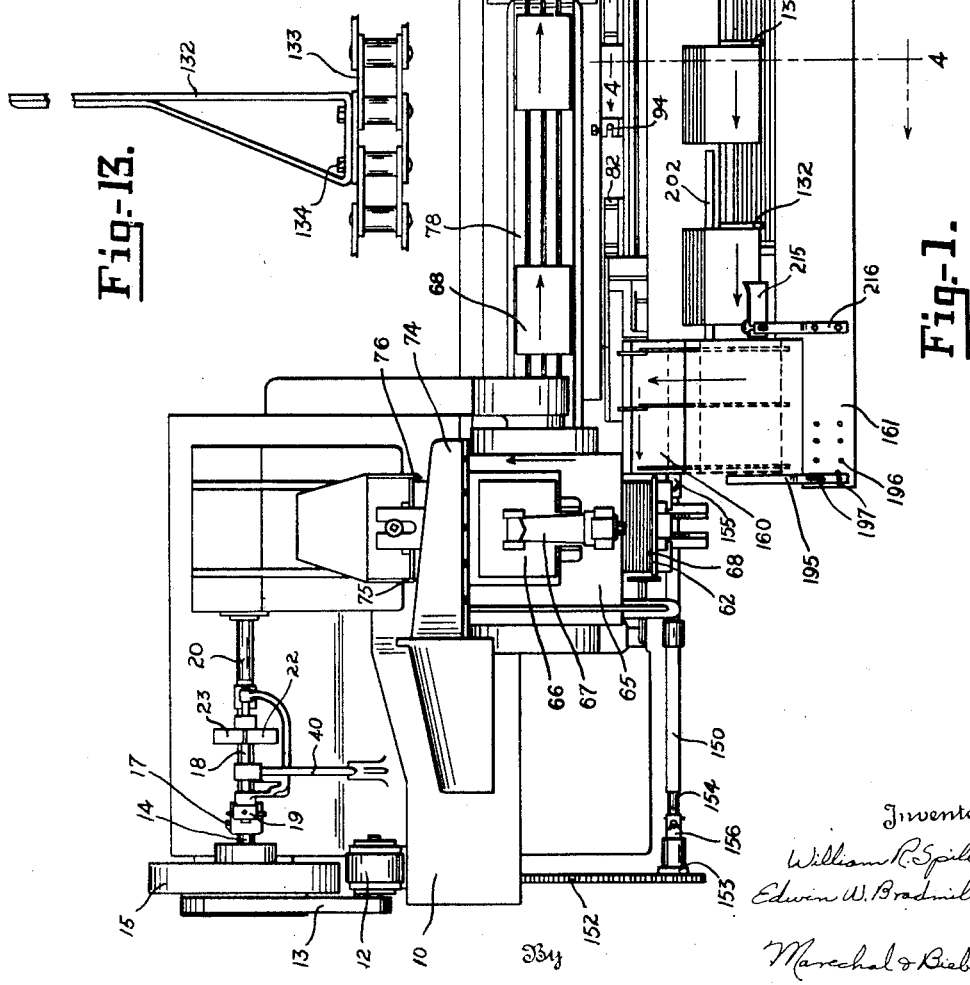
Inventors
William R. Spiller
Edwin W. Bradmiller
By Marechal & Biebel
Attorneys

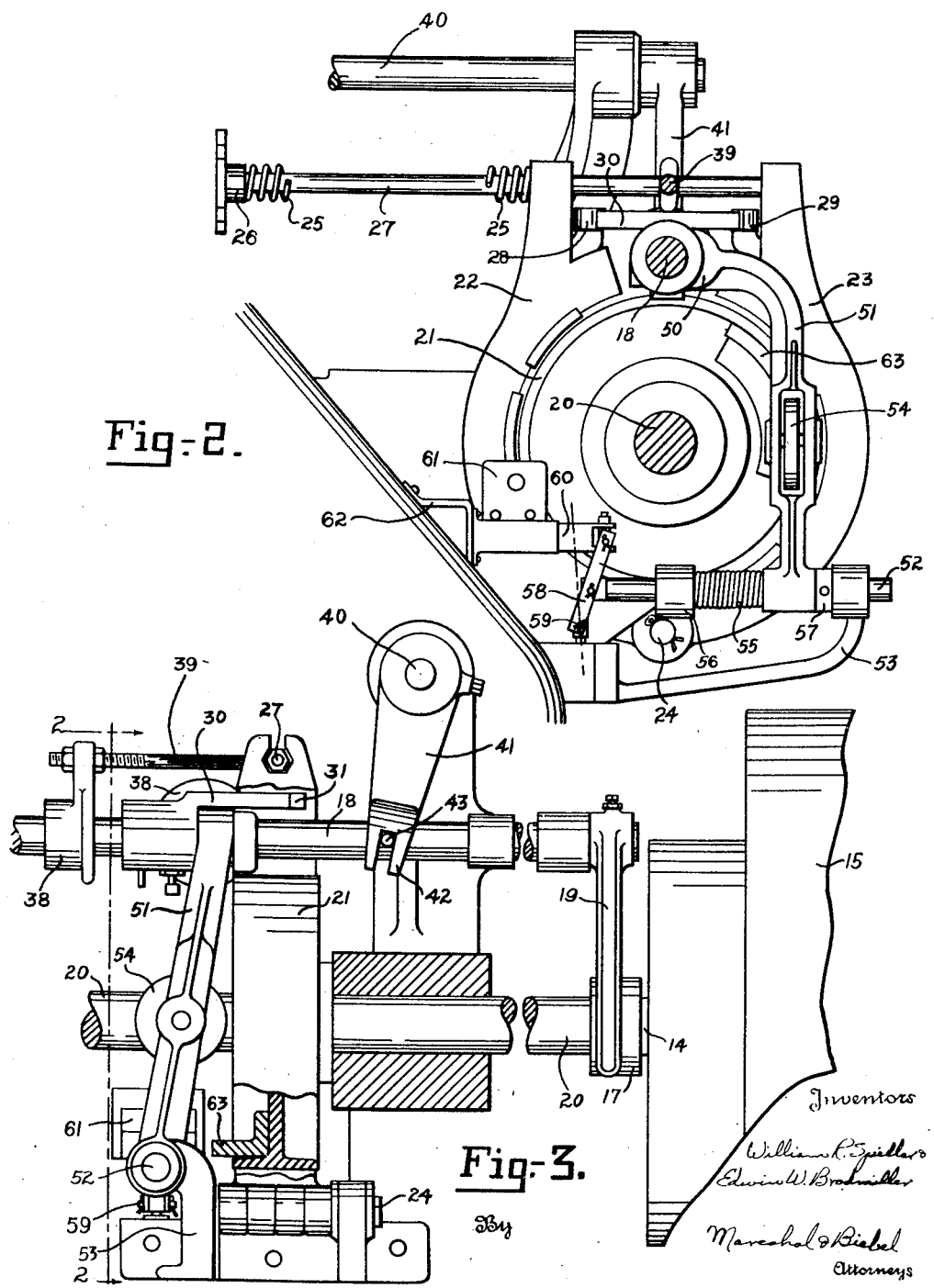

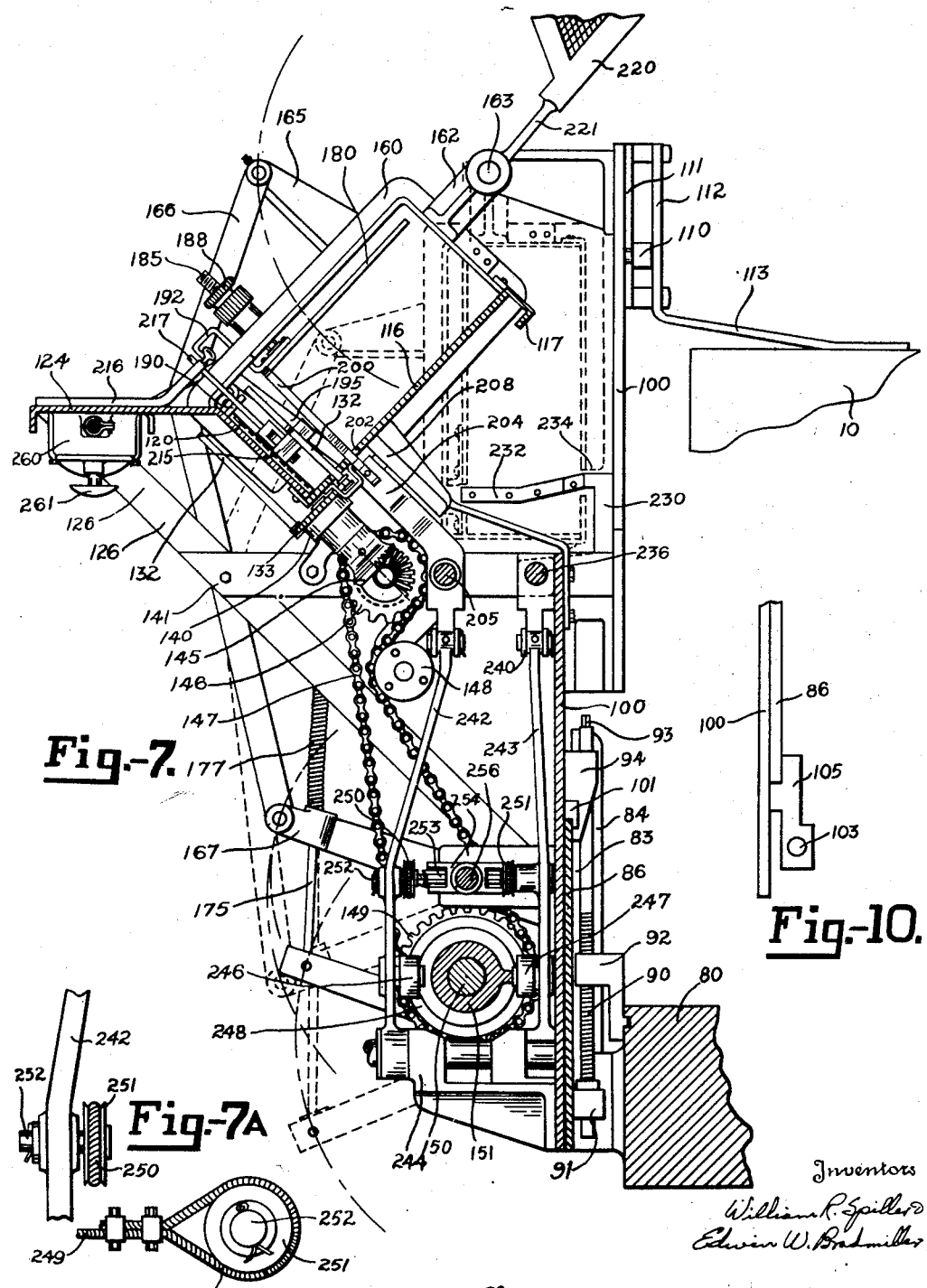

Dec. 26, 1950 W. R. SPILLER ET AL 2,535,240
FEEDING MECHANISM
Filed Jan. 20, 1945 10 Sheets-Sheet 7
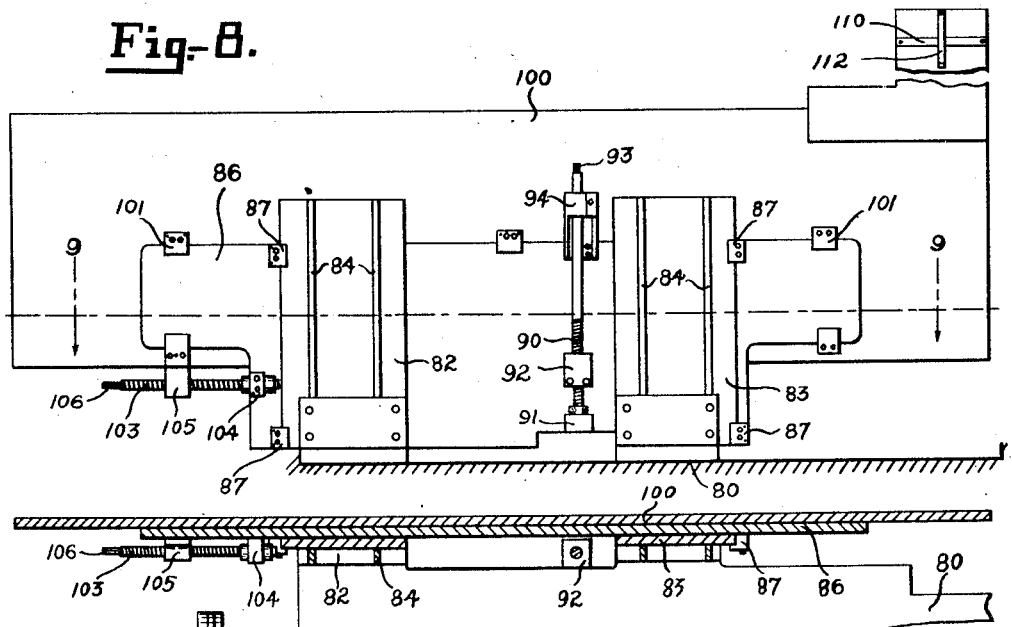
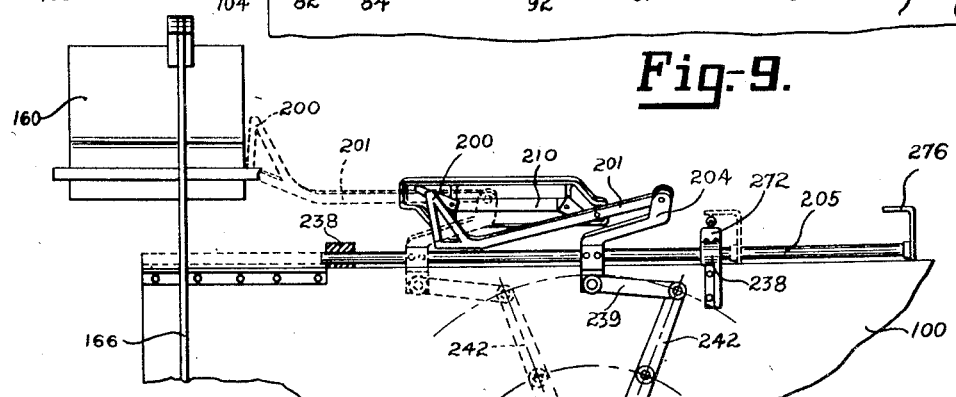
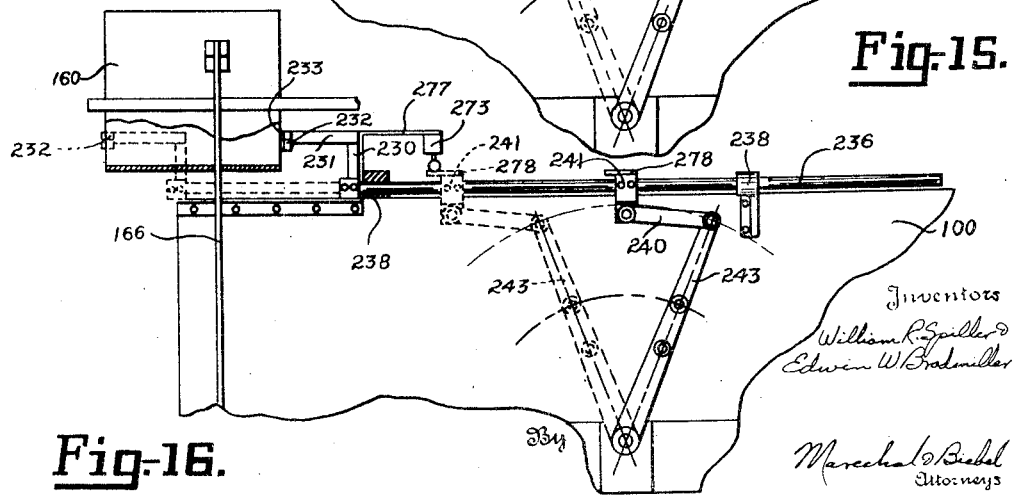
Inventors
William R. Spiller &
Edwin W. Brademiller
By Marechal & Biebel
Attorneys Dec. 26, 1950  W. R. SPILLER ET AL  2,535,240
FEEDING MECHANISM
Filed Jan. 20, 1945  10 Sheets-Sheet 8
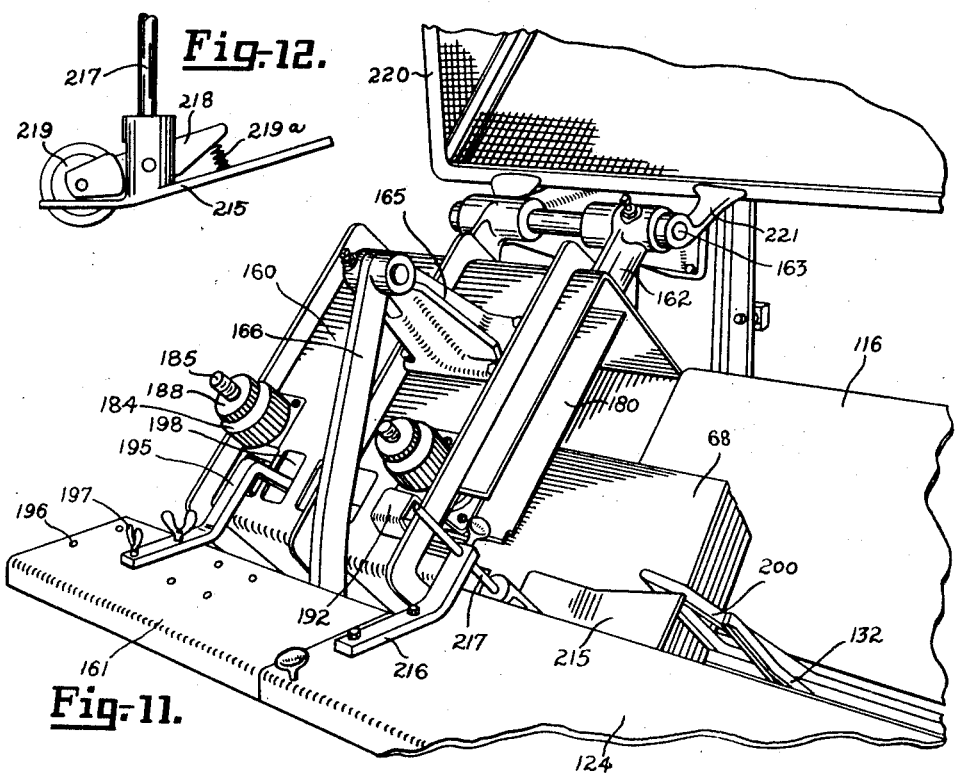
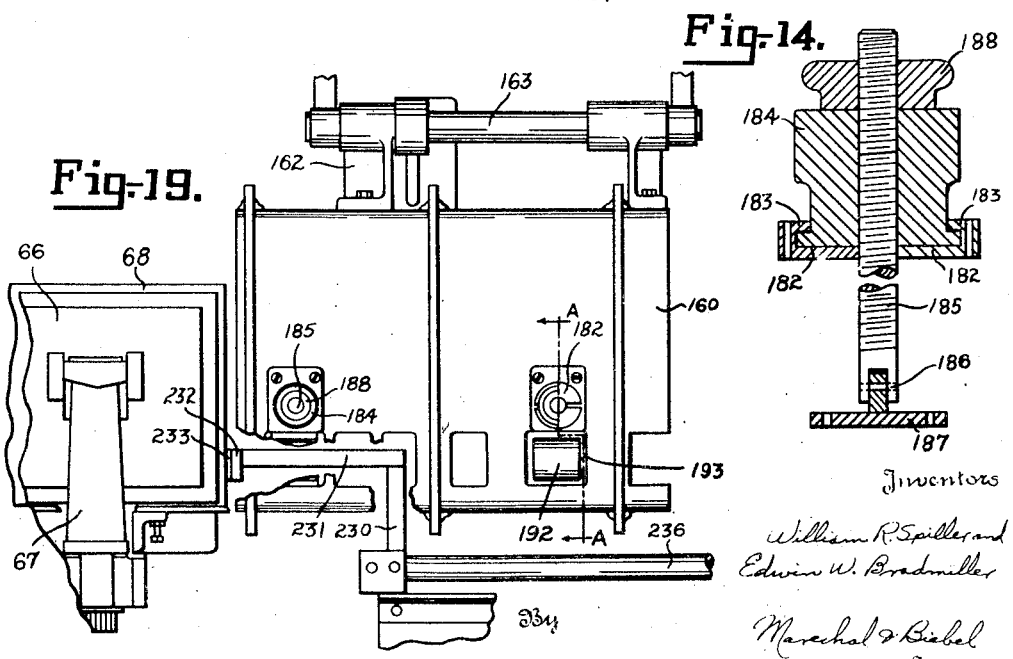

Dec. 26, 1950  W. R. SPILLER ET AL  2,535,240
FEEDING MECHANISM
Filed Jan. 20, 1945  10 Sheets-Sheet 9
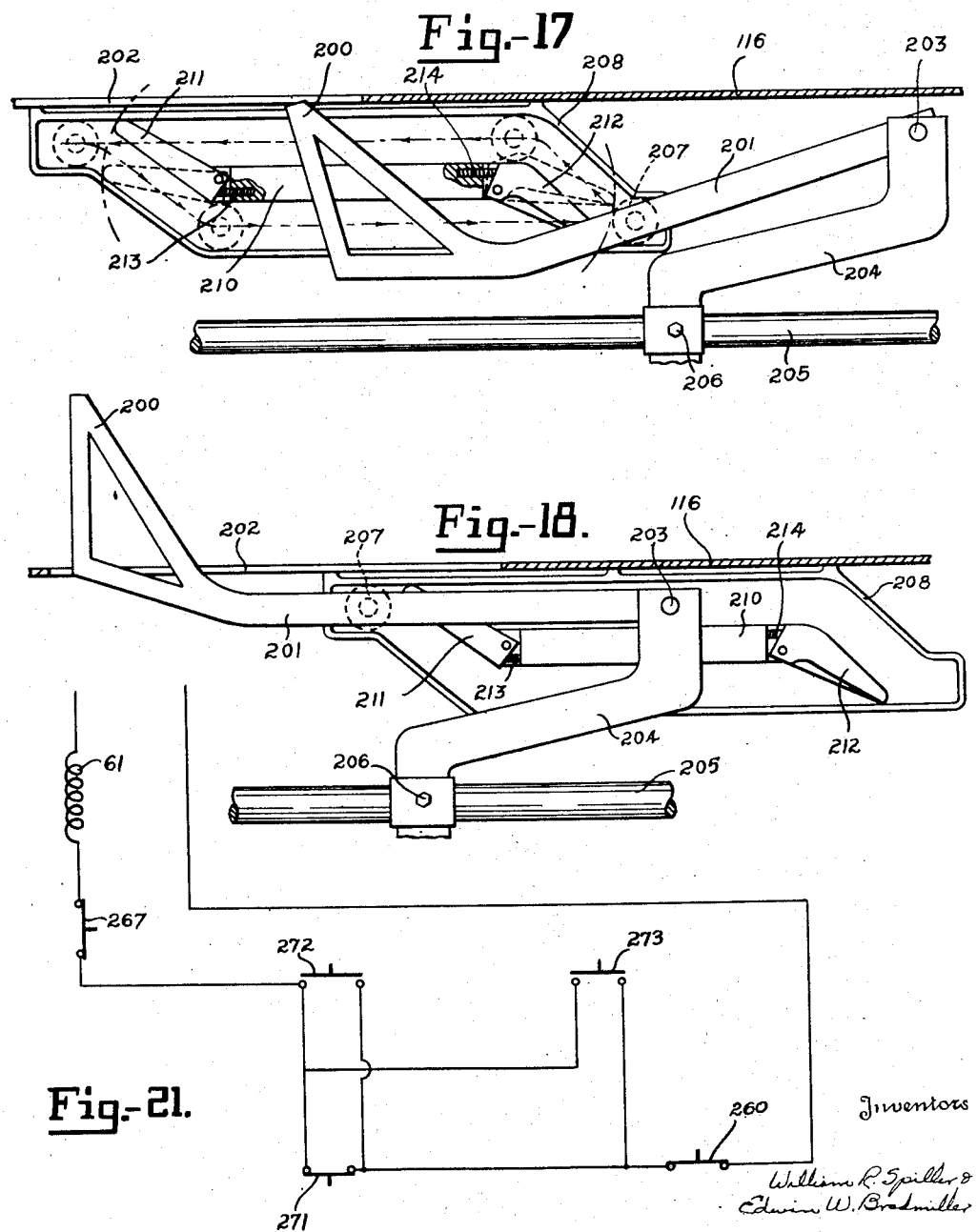

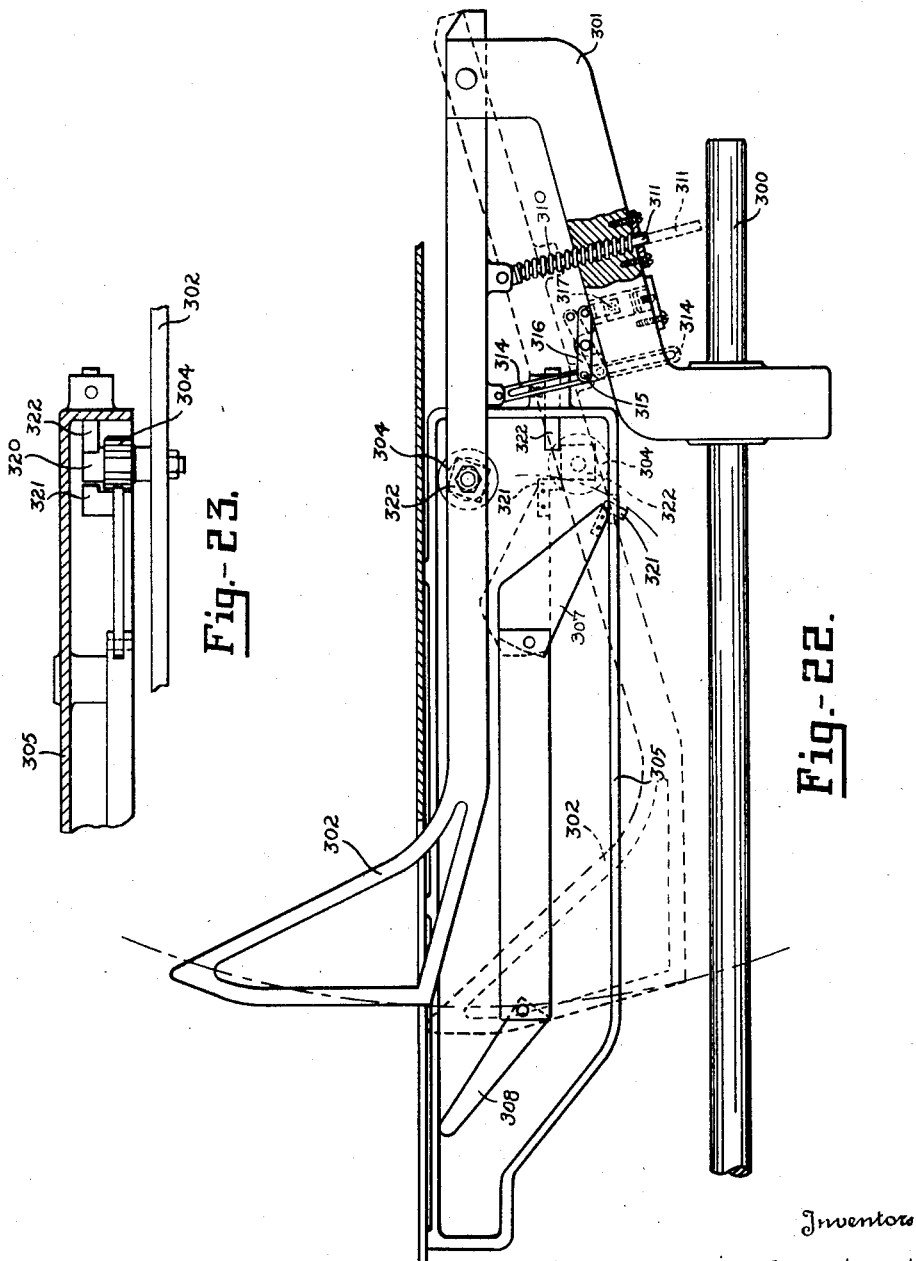

Patented Dec. 26, 1950

2,535,240

UNITED STATES PATENT OFFICE 2,535,240

FEEDING MECHANISM

William R. Spiller and Edwin W. Bradmiller, Dayton, Ohio, assignors to Harris-Seybold Company, a corporation of Delaware Application January 20, 1945, Serial No. 573,748

28 Claims. (Cl. 164—48)

This invention relates to feeding devices and more particularly to the feeding of paper material in the form of signatures or a pile or stack of sheets.

It is the principal object of the invention to provide a feeding device for feeding such paper material rapidly and uniformly to a work position where it is delivered in accurate and predetermined centered relation with respect to a receiving member so that it may be clamped therein and a work operation performed thereon.

It is also an object to provide such a feeding device which is readily adjustable for receiving sheets or signatures of varying size and in stacks of varying thickness, and which provides for the delivery thereof to the clamp of a trimmer or the like in proper and uniform relation and with the different size sheets accurately centered with respect to such clamp.

It is a further object to provide such a feeding device which is simple and inexpensive in construction, accurate and reliable in operation, and which affords complete safety against injury or damage either to the operator or to the machine itself.

It is a further object to provide a feeding device in which the forward feeding movement of the paper material takes place through a yielding connection in the drive mechanism which will yield if there is an obstruction to the normal operation to terminate the feeding action at once and thereby to avoid possibility of damage to the machine.

It is a further object to provide a feeding trough for receiving groups of signatures or stacks of sheets of paper material and through which such paper material is advanced, the trough being constructed to facilitate the maintenance of the sheets of each group in predetermined fixed relation to each other without shifting during the time that they are passing through the trough.

It is a further object to provide a feeding device for the receiving of groups of signatures or other sheet material and for delivery thereof in accurately aligned assembly into the clamp of a trimmer to maintain such alignment and avoid the tendency for the sheets to slip as supplied to and while in the trimmer clamp.

It is a still further object to provide a feeding device which is arranged to be bodily adjusted horizontally and vertically to accommodate paper material of different size and to effect delivery thereof in accurately centered relation with respect to a trimmer, and in which the power for operating such mechanism is transmitted through adjustable or flexible connections from a stationary point.

It is a further object to provide a drive for a machine which provides for the stoppage of the machine quickly and definitely either upon the occurrence of an abnormal condition of operation or under the control of the operator and which requires a definite manual restoring action on the part of an operator in order to be again placed in operative condition.

Other objects and advantages will be apparent from the following description, the accompanying drawing, and the appended claims.

In the drawing,

Fig. 1 is a plan view of a feeding device constructed in accordance with the present invention in association with a typical trimmer, and showing the path of travel of the paper material as fed to and delivered therefrom;

Fig. 2 is a sectional view of the combined clutch and brake actuating mechanism for controlling the drive to the entire device on the line 2—2 of Fig. 3;

Fig. 3 is a side elevational view and Fig. 4 is a plan view of the same mechanism shown in Fig. 2;

Figs. 7A and 7B are broken detail views in end feeder trough immediately adjacent the drive sprocket mechanism and looking toward the delivery end of the trough;

Figs. 7A and 7B are broken detail views in end and side elevation respectively showing the connection of the flexible cable to the actuating arms for the feeding fingers;

Fig. 8 is a rear elevational view of the supporting mechanism providing for the vertical and horizontal adjustment of the feeder trough;

Fig. 9 is a horizontal sectional view on the line 9—9 of Fig. 8;

Fig. 10 is a detail end elevational view of the horizontal adjusting mechanism for the feed trough;

Fig. 11 is a perspective view of the carrier in its receiving position with a stack of paper material being fed or supplied thereinto;

Fig. 12 is a side elevational view of a detail showing the guide which provides for holding the stack of sheet material as it is delivered into the carrier;

Fig. 13 is a detail view of the sprocket chain and the feeding finger for advancing the sheet material through the trough;

Fig. 14 is a sectional view through one of the adjustable supports for setting the intermediate wall of the carrier to provide for retaining the paper material therein under a predetermined pressure condition;

Fig. 15 is a somewhat schematic view showing the operation of a feeding finger which delivers the paper material from the trough into the carrier in the receiving position of the latter;

Fig. 16 is a similar schematic view showing the operation of another feeding finger which operates following the movement of the carrier to its discharge position for discharging the paper material therefrom;

Figs. 17 and 18 are plan views on an enlarged scale showing two positions of the forward feeding finger and its actuating mechanism which delivers the paper material from the trough into the carrier, the views being drawn looking directly toward the mechanism and in a direction substantially parallel with the rear wall of the trough;

Fig. 19 is an elevational view showing the carrier in its discharge position in relation to the clamp, parts being broken away to show the feeding finger at the end of its forward feeding stroke;

Fig. 20 is a detail view of the rear feeding finger for delivering the sheets into the clamp of the trimmer;

Fig. 21 is a circuit diagram showing electrical connections for controlling the operation of the clutch and brake mechanism to provide for safety of operation for the operator and for the machine itself; and Fig. 22 and Fig. 23 are views in side elevation and plan, respectively, showing a modified arrangement of the mechanism for projecting the forward feeding finger into operative position.

Figure 4:
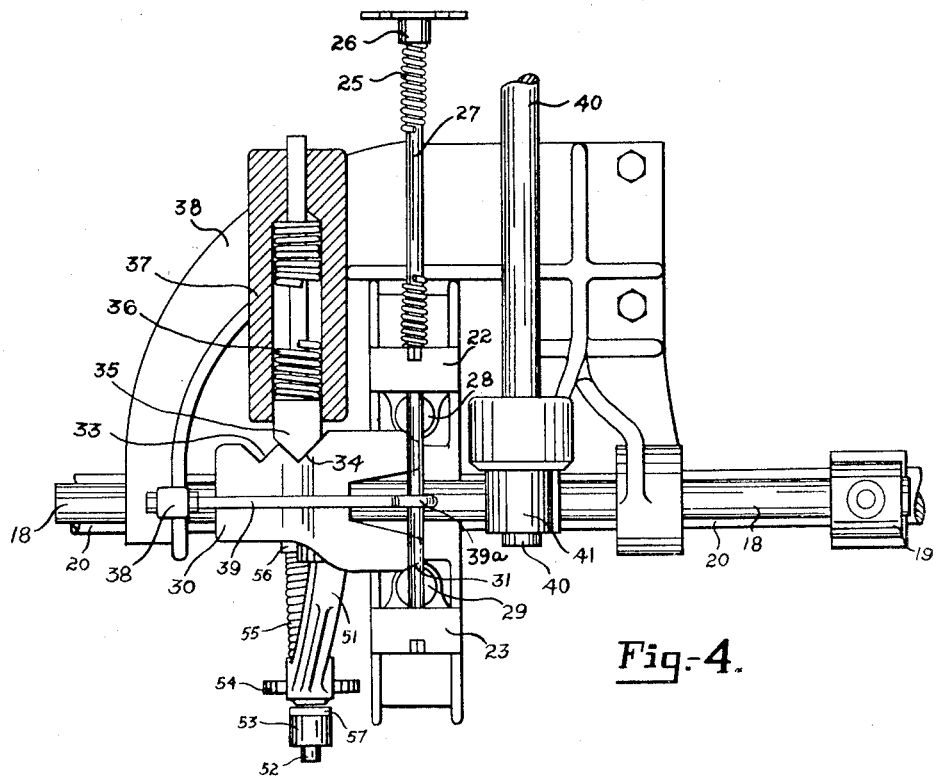

In the handling of paper material it is desirable to be able to trim a pile or stack of sheets, either loose or bound or gathered together, or in the form of a signature, in order to provide definite margins and uniform edges. This is particularly important in the manufacture of books and magazines where the paper material after being printed and gathered into groups of sheets or signatures, is then required to be trimmed. This operation entails the feeding of the paper material to the trimmer in properly correlated relation with respect thereto, to assure the regular and uniform delivery thereof, and in properly centered relation with respect to the trimmer device to assure the production of the desired uniform margins on all sides.

In one type of trimmer, the paper material is received in a clamp, and while so clamped is moved through successive operative positions where the necessary trimming operations are performed first upon one side and then upon the ends, the clamping action being continuously maintained so that there is no possibility of movement or slippage. This requires the proper delivery of the paper material to the clamp, and in properly centered relation with respect thereto, leaving a side and two ends sufficiently exposed to permit of performing the trimming operation. The paper material must therefore be fed accurately, and under such conditions that it will be received in the clamp in a proper manner and without any of the sheets or signatures of the group being allowed to slip, bend over, or become otherwise misaligned. It is further desirable to hold the paper material closely but without substantial pressure while it is being delivered into the clamp and in that way to minimize the possibility for such misalignment to occur.

It is also important to provide for the handling of different thickness of the paper material, and to provide the same accuracy of location when groups of sheets of different thickness are to be handled. Further, it is important to provide for the handling of paper material of different length and width, as represented by magazines of different size, for example, and to assure the delivery of all such material to the trimmer in properly centered relation with respect thereto. Since the feeder may be required to handle runs of sheets of different size, it is important to provide for its adjustment for a change in size with the minimum of work and time, so that the change can be quickly and easily accomplished by the operator.

Still further, because of the dangerous character of the trimming operation, it is important to provide for the feeding of the paper material under such conditions that the operator is adequately protected against injury, and likewise to arrange the machine so that failure of the feeding operation to be performed in the desired manner will result in prompt stoppage of the operation before any damage to the mechanism thereof has occurred.

Referring to the drawings which disclose a preferred embodiment of the invention, a trimmer is shown generally at 10 (Fig. 1), such mechanism being shown for purposes of illustration as of the turret head type, such as shown in Seybold et al. Patent No. 1,469,733, but without limiting the practicing of the present invention to a trimmer of this particular construction. It comprises a suitable power source such as a drive motor 12 which is belt connected as shown at 13 to a main drive shaft 14 on which there is also carried a flywheel 15. The shaft 14 is provided with a clutch 17 which is actuated by a clutch actuating rod 18 carrying a yoke 19 directly engageable with the clutch.

The driven shaft is shown at 20 (Figs. 2 and 3) on which there is mounted a brake drum 21 which is engageable by means of brake shoes 22, 23 pivoted respectively on shaft 24. The brake shoes are normally urged into braking engagement with the drum by means of spring 25 (Figs. 2 and 4) working against an adjustable collar 26 at one end and shoe 22 at its other end. Rod 27 is threadedly received in collar 26 and at its opposite end in shoe 23, the spring under compression thus acting to develop a continuing force to apply the brake.

In order to retain the brake in off position the shoes 22, 23 are provided at their upper parts above the drum with rollers 28, 29. A brake release dog or wedge 30 fixed to shaft 18 is formed with a pair of arms having tapered ends 31 which engage the respective rollers when moved to the right as shown in Figs. 3 and 4, thereby forcing the rollers and through them the brake shoes apart against the action of spring 25 and thus releasing the brake. The body of the wedge 30 is formed with two relatively deep notches 33 and 34 which cooperate with a detent 35 pressed by spring 36 into one or the other of the notches. The detent and spring are mounted for axial movement in a guide 37 formed as part of a bracket 38 which is suitably secured to the trimmer housing. The two arms of bracket 38 serve as supports for the clutch actuating shaft 18. A rod 39 fixed at one end in bracket 38 has a looped end 39a through which shaft 27 extends and by means of which it is guided and supported.

The bracket also serves to support a shaft 40 extending at right angles to shaft 18 and projecting into the body of the trimmer. Axial movement of shaft 18 between its two positions (a) where the clutch is engaged and the brake is off, and (b) where disengaged and the brake applied, is made to effect a turning movement of shaft 40 through shift lever 41 secured to shaft 40 and having a forked end 42 engageable over a pin 43 on shaft 18. Suitable connection is made to shaft 40 such as through link 45 on the front or operator's side of the trimmer, and a foot treadle 46 (Figs. 5 and 6) is provided for actuation by the operator.

The wedge 30 carried by shaft 18 is arranged to be engaged and actuated by the forked end 50 of an arm 51 which is pivotally carried on transversely extending shaft 52 suitably supported in bracket 53 from the main frame of the machine. At an intermediate point, the arm carries a roller 54 which is free to revolve on a pin carried by the arm.

The arm 51 is free to move axially of shaft 52 and is urged toward the right as shown in Fig. 2 under the action of compression spring 55 which acts against a fixed member 56 integral with bracket 53. The shaft 52 is arranged to be drawn in the opposite direction, to thereby cause movement of arm 51 to the left under the action of collar 57 which is pinned to the shaft. This movement is effected by means of a lever 58 pivotally supported at 59 and having its intermediate point connected to shaft 52 which is free to swing as necessary to accommodate the arcuate movement of the lever. At its upper end the lever is connected to an armature piece 60 which forms part of a solenoid 61 fastened by bracket 62 to the frame of the machine.

One side face of the brake drum 21 is provided inwardly of the periphery thereof with an arcuate cam 63 which has a rise such that it will engage with roller 54 when in proper alignment therewith, thereby rocking arm 51 about shaft 52 and causing the movement of control shaft 18 in such a direction as to disengage clutch 17 and provide for the application of the brake shoes 22, 23 under the action of spring 25.

Such operation is controlled in response to the energization of solenoid 61. When energized the solenoid attracts its armature and causes movement of shaft 52 to the left as shown in Fig. 2, thereby moving roller 54 to a position radially inward of cam 63. As a result the brake drum is allowed to rotate continuously without any engagement occurring between the cam and the roller 54, this being the condition for normal operation of the machine. It will be understood that movement of the arm 51 causes the wedge 30 to move from one position of the detent 35 to the other, the detent yieldably retaining the parts in either position. Under the conditions described, for continuous operation, the detent rests in notch 33.

Upon the deenergization of solenoid 61, the armature is released, and spring 55 moves arm 51 to the position shown in Fig. 2. As shaft 20 rotates, cam 63 comes into alignment with roller 54, the rise on the cam forces the arm 51 and shaft 18 toward the left as seen in Fig. 3 to the position where the clutch is disengaged. Simultaneously the brake is immediately applied and the detent 35 rests in notch 34. It will be clear that if desired more than one such cam 63 may be employed, and that as a result of such control, the operation of the machine is terminated immediately upon the deenergization of the solenoid, with the power being disconnected and with the inertia of the driven parts being quickly overcome through the prompt application of the brake. In actual practice the machine is found to stop its operation within about one revolution or less of the brake drum following deenergization of the solenoid.

Concurrently with the operation as described the foot treadle 46 is moved from one position to the other through the connections provided by shaft 40 and associated parts and when actuated by the operator, the treadle thus provides for control of the operation of the machine for both running and stopping. When the drive is automatically cut off upon deenergization of solenoid 61 as described above, the foot treadle is automatically moved to its off position just as it is when moved by the operator, and it remains there with the machine inoperative until positively restored by a positive movement to the on position. Such treadle movement by the operator overcomes the action of detent 35 and restores the parts to their normal or operative position where they remain as long as the solenoid 61 remains energized.

The driven shaft 20 extends into the trimmer, the shaft being suitably arranged to cause actuation of the turret head 65 (Figs. 1 and 6) which is supported for rotation about a horizontal axis. Operating control of the trimmer is provided by the foot treadle 46 which may be set to either a run or a stop position. The turret head is shown as having four faces each provided with a clamp 66 which is adjustably carried by arm 67 and arranged to be opened and closed through suitable mechanism in known manner, in response to the indexing of the head through its successive series of stations. In the position shown in Fig. 6, the vertically extending clamp is fully opened and is receiving a group of paper sheets or signatures 68, which are being delivered into the clamp. A suitable stop or limit guide 69 is provided for limiting the inward movement of the paper material, such guide being automatically moved away to a clearance position when the head indexes through the action of a roller 70 engaging cam track 71 to rock the guide about its pivotal support at 72.

Figure 6:
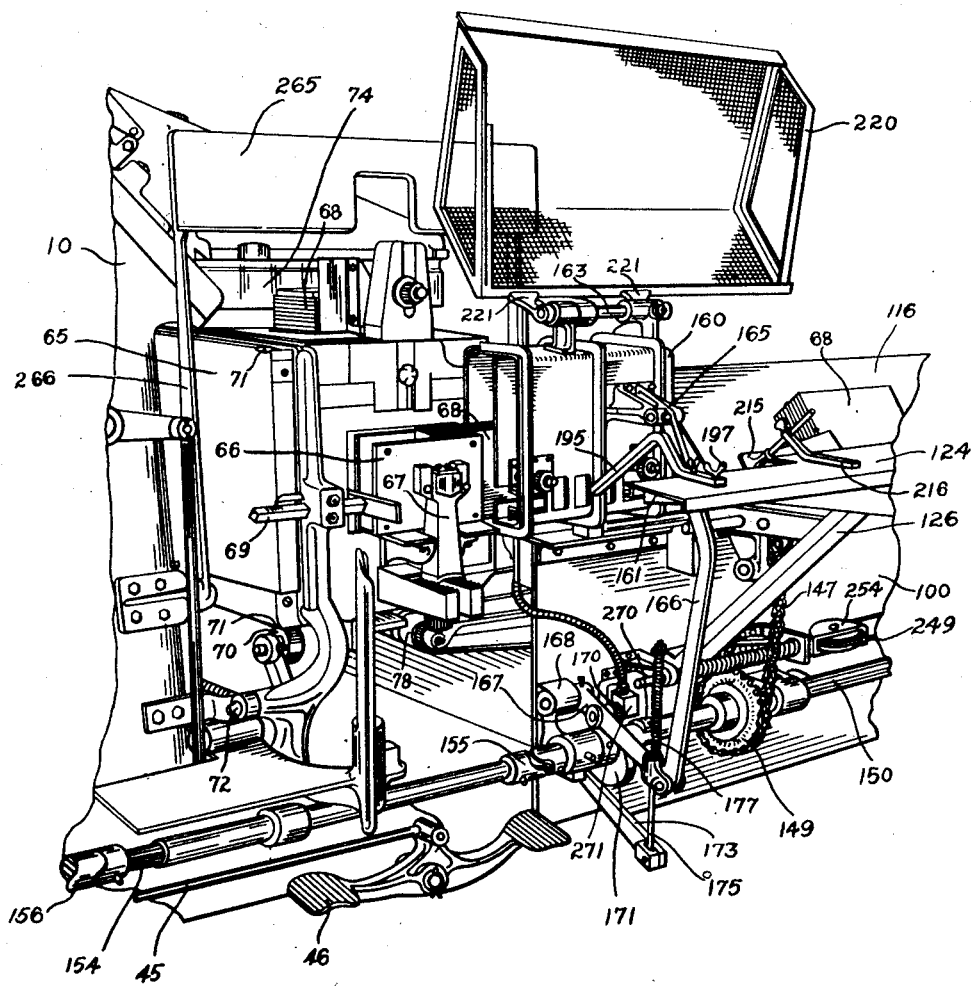
Fig. 6 is a perspective view looking downwardly toward the feeder and taken from the discharge end thereof, also showing the turret head and the receiving clamps on the trimmer.

After the paper material is received in the clamp in the receiving position of the turret, shown as the vertical position in Fig. 6, the turret head then indexes upwardly to the second position where the paper material is shown as being held in the clamp in a horizontal position while the cutter knife 74 (Figs. 1 and 6) moves downwardly to trim the exposed side edge thereof. There is no movement of the clamp or of the paper material in this position, the clamp remaining in closed position so that there is no possibility of a shift occurring in the position of the paper material while supported therein.

The turret head then indexes to the third position where the pair of side knives 75, 76 (Fig. 1)

move inwardly to trim the exposed ends of the paper material, the clamp still remaining closed and holding the paper material in fixed position.

In its fourth position, the turret head rotates to carry the now fully trimmed paper material to the bottom face, in which position the clamp is automatically opened, and the trimmed paper material is dropped onto a suitable conveyor such as the endless bands 78 (Fig. 1) which remove it from beneath the trimming mechanism and to a suitable point of discharge. Inasmuch as the trimmer mechanism itself forms no part of the present invention, it is believed unnecessary to disclose the mechanism in any more detail.

In order to provide for the proper delivery of the paper material into the clamp of the trimmer in the receiving position thereof, a feeding trough is provided into which the paper sheet material is supplied in groups or stacks of predetermined size, such groups of paper material then being carried forwardly and delivered in regular sequence into the clamp of the trimmer. This feeding mechanism comprises a base 80 which rests on the floor and is bolted or otherwise attached to a part of the trimmer itself. The base is formed with a pair of vertically extending guide plates 82, 83 (Figs. 8 and 9) which are ribbed as shown at 84 to provide additional strength. These plates have vertically extending side edges which serve as guides for a vertically adjustable plate 86, the latter carrying brackets 87 which have sliding engagement along the vertical edges of the plates 82, 83 to provide for such vertical adjusting movement. The position of plate 86 is adjusted vertically through the use of a jack screw 90 supported from a collar 91 carried by plate 86 and which has threaded engagement with a bracket 92 fixed upon base 80. The jack screw is supported above the floor level and has an upwardly extending non-circular end portion 93 which is accessible from the rear faces of the machine so that by application of a wrench thereto, the plate 86 may be raised or lowered and thus predetermined as to its vertical position upon the guide plates 82, 83. A split clamp 94 is provided which serves as a supporting member as well as clamping the screw to hold it in fixed position.

The top and bottom horizontal surfaces of plate 86 form guides for a vertically extending plate 100 which constitutes the main frame on which the trough and the main body of the feeding mechanism are supported. Plate 100 carries brackets 101 which engage the top and bottom surfaces of plate 86 at a plurality of points and thus support the frame thereon while providing for adjustment in the horizontal position thereof. Such adjustment is effected through the provision of jack screw 103 which has an abutment 104 carried by the plate 86 and which has threaded engagement with a bracket 105 carried by the movable frame. The end 106 of the jack screw is accessible at the end of the machine for the application of a wrench for effecting the turning of the screw to slide the plate 100 longitudinally upon plate 86.

In order additionally to guide and support the frame, the upper part thereof is provided with a guide bar 110 (Figs. 7 and 8) which is mounted in spaced relation upon the rear of plate 100 and is adapted to have adjustable sliding engagement between bars 111 and 112 which are suitably supported by bracket arm 113 from a fixed part of the trimmer 10. Bar 110 thus is free to move both vertically and horizontally with the movements of the frame while at the same time obtaining support from the trimmer to avoid objectionable movement or vibration of the feeder.

From the above description it will be understood that the entire frame on which the feeding device is supported is mounted for movement in a horizontal or longitudinal direction as necessary to compensate for differences in the length of the paper material being handled. Likewise the entire mechanism is mounted for independent movement transversely or in a vertical direction as necessary to compensate for differences in the width of the paper material being handled. By suitably operating either or both of these adjustments, the entire feeding mechanism is made adjustable for the handling of different size sheets or signatures, with a minimum of changing and resetting and without requiring any readjustment of the driving connections for the working parts, thereby greatly facilitating the adaptability of the mechanism for the handling of different size material.

Frame 100 forms the support for the feed trough which is shown generally at 115 (Fig. 1). The trough is V-shaped in cross-section, and of substantial longitudinal extent to provide working positions for a number of operators in the supplying or loading of the paper material to the feeder. The trough has a smooth rear face 116 which is formed with an overturned flange 117 providing increased strength. Substantially at right angles to the face 116 is a forward face 118, this face being formed with a series of rather shallow raised ribs 120 (Fig. 7) which extend parallel to the longitudinal dimension of the trough, and are relatively closely spaced to each other. The trough is preferably supported with both of its faces extending at substantially a 45° angle with respect to the horizontal, thereby forming a V in which the paper material is naturally received.

In operation the paper material is adapted to be received in the trough with the flat side of the material in engagement with the face 116 of the trough, the edges thereof being in engagement with the forward face 118. The ribs 120 are thus available for opposing any creeping or relative shifting tendency of the sheets which form the stack or pile of paper material, acting to maintain the sheets without such objectionable shifting movement throughout their travel along the trough.

Along its forward side, the trough is formed with a continuation 124 which extends substantially horizontally to serve as a table or work receiving space, and a strengthening flange 125 is similarly formed on the front edge. Supporting arms 126 and brackets 127 provide proper support for the feed table 124 from plate 100.

A conveyor operates through a slot 130 (Fig. 1) in the rear face 116 of the trough and provides for the continuous feeding of the groups of paper material lengthwise of the trough toward the discharge end thereof, in the direction of the arrows shown in Fig. 1. The conveyor is formed with a series of fingers 132 which are adapted to be secured to sprocket chain 133 and removably held in position thereon by means of nuts 134 (Fig. 13). The sprocket chain travels around a sprocket wheel 136 (Fig. 5) at the rear end of the trough which is mounted on a bracket 137 carried on extension rods 138 which in turn are supported from a cross-brace 139 on a part of the frame. The opposite end of the sprocket chain is adjacent the discharge end of the trough where it passes around a forwardly located sprocket wheel 140 which is similarly supported from cross-brace 141. The chain thus has a forward flight within the trough in which the conveyor fingers travel forwardly along the trough in position parallel to the front face 118 and spaced somewhat thereabove as seen in Fig. 7.

At the forward end of their travel the fingers pass through a slot 142 in the forward face of the trough and return on a reverse flight beneath the trough. The fingers are suitably spaced to permit the loading of several groups of sheets or signatures in spaced relation to each other in the trough, making it possible for several operators to work along the length of the trough placing the stacks of paper material in the trough in advance of the respective fingers (Fig. 1).

Figure 5:
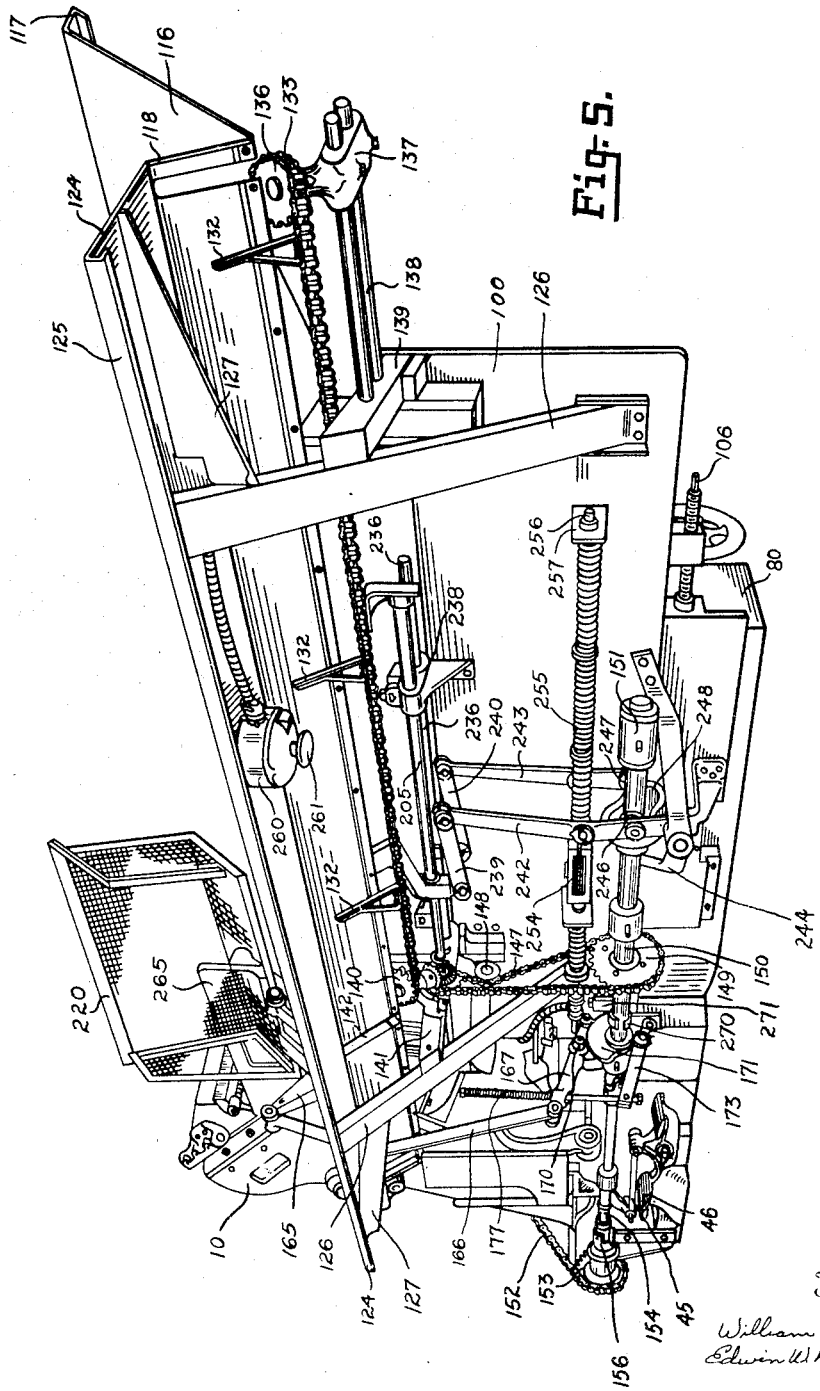
Fig. 5 is a perspective view of the front face of the feeder from the receiving end looking upwardly at the operating mechanism thereof below the feed trough.

The sprocket chain 133 is actuated by a drive for sprocket wheel 140, this drive embodying beveled gearing 145, actuated from sprocket wheel 146 (Fig. 5). A sprocket chain 147, running over an idler wheel 148 extends vertically downward from wheel 146 and passes around a drive sprocket 149 which is secured to a drive shaft 150.

Drive shaft 150 is carried in bearings 151 fixed to plate 100 and is driven in definitely timed relation with the operation of the trimmer, this being preferably accomplished by providing a sprocket chain 152 (Figs. 1 and 5) which is driven from a suitable power connection in the trimmer itself, at such speed as to provide for one rotation of driven shaft 150 in response to one rotation or one cycle of operation of the trimmer. Sprocket chain 152 drives a sprocket wheel 153 which is connected with the shaft 150 through a splined slip joint drive 154 and through two universal joints 155 and 156, one at either side of the spline drive (Fig. 6). It will be understood therefore that this driving connection is established and maintained notwithstanding the variable location of the plate 100 and with it the driven shaft 150, since the splined connection 154 accommodates the drive to longitudinal adjustment while universal joints 155 and 156 accommodate the drive to vertical adjustment of the frame. The operator therefore need only make the two necessary adjustments on the location of the feed trough and need not make any change in or in fact pay any attention to the drive for operating the mechanism thereof.

A transfer carrier or basket indicated generally at 160 is mounted adjacent the discharge end of the trough, the trough being suitably recessed as indicated in Figs. 1 and 6, to receive the carrier leaving a projecting part 161 of the work table toward which the carrier moves when in its forward or receiving position. The carrier provides for successively receiving the groups of sheet material or signatures as they are fed in the continuation of their longitudinal travel through the trough, following which they are moved in a transverse direction to a position immediately adjacent the waiting clamp on the trimmer. At this latter position the paper material is discharged from the carrier directly into the clamp, and the carrier then returns to its receiving position in preparation for a subsequent cycle of operation.

For this purpose, the carrier 160 is supported by brackets 162 which are pivotally mounted on horizontal shaft 163 which in turn is suitably supported from the frame 100 of the feeder in elevated position above the trough. It will also be clear from Fig. 7 that the pivot axis 163 about which the basket turns is so located that when the basket is in its receiving position, shown in full lines in Fig. 7, it has been rocked to correspond with the angular position of the trough, the walls of the carrier then being substantially parallel to and a direct projection from the walls of the trough. When rocked to its discharge position, shown in dotted lines in Fig. 7, the carrier is then substantially vertical and as such is in position to discharge directly into the clamp of the trimmer.

To actuate the carrier between its receiving and discharge positions, its front face is provided with a bracket 165 to which there is pivotally attached an extended link 166 which projects down below the trough and at its lower end is connected to a pivoted arm 167, the inner end of which is pivotally mounted on plate 100 by means of bracket 168. At an intermediate point, arm 167 carries a roller 170 which runs in contact with a cam 171 fastened to the shaft 150. A further arm 173 is pivotally mounted on plate 100 below and substantially parallel with arm 167 and has similar roller engagement with cam 171. A rod 175 is fastened to arm 173 and projects upwardly through an enlarged opening in arm 167, spring 177 urging the two arms together so that the respective rollers normally run in contact with cam 171.

In operation, as shaft 150 turns, the rise of cam 171 will first effect the lifting of arm 167 and through it of link 166, causing the movement of the basket from its receiving to its discharge position. Lower arm 173 also moves upwardly at the same time through the action of spring 177. In the next half cycle the rise in cam 171 causes the downward movement of arm 173, this being transmitted through spring 177 to cause a reverse movement of arm 167 and link 166, thereby resulting in the return movement of the carrier from its discharge position to its forward position. In the event however that there should be any obstruction in the path of the movement of the carrier from its forward or receiving position to its discharge position, it will be clear that the spring 177 will yield without forcing the return movement of the carrier, thereby providing protection against damage to the parts of the machine mechanism or injury to the operator.

Figure 19A:
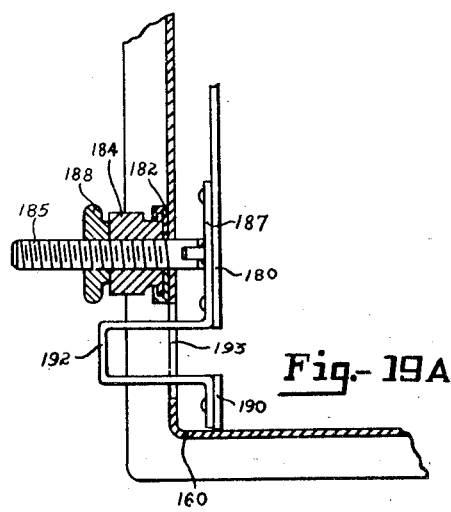
Fig. 19A is a vertical sectional view on line A—A of Fig. 19.

The carrier has front, rear and top and bottom walls while both its ends are open. In addition it has an intermediate adjustable wall or plate 180 (Figs. 7, 11, and 19A). This wall is supported in generally parallel relation with respect to the front and rear walls and its spacing therefrom is adjustable to provide for receiving groups of paper material of different thickness, to hold the same closely against slipping while at the same time so lightly that relatively free movement of the paper into and out of the carrier is afforded. Adjustable supports for this wall are provided including split collars 182 which are secured to the front wall of the carrier and which have flanged portions 183 (Fig. 14) providing for receiving therein adjusting nuts 184 which are thus supported for manual rotation. The nuts adjustably receive the threaded studs 185, the inner ends of which are pivotally attached as shown at 186 to a plate 187 which is secured to and supports the intermediate wall 180. Lock nuts 188 provide for retaining the parts in any predetermined adjusted position. Two of these adjusting mechanisms are provided and it will be apparent that in response to the setting or adjustment thereof, the wall 180 can be supported in fixed predetermined spaced relation with respect to the rear wall of the carrier thereby providing for receiving paper material of the desired thickness. If desired, a slight offset may be provided in the angular relation of the wall 180 to the main body of the carrier, allowing the end thereof into which the paper material is fed to have a slightly larger spacing than the opposite end, to avoid possibility of interference while maintaining the plate in close contact with the paper material while in the carrier.

It is desired to provide for maintaining this guiding and holding action across the entire width of the sheets of paper material while in the carrier, and particularly on the lower edge thereof. At the same time it is necessary to provide for the discharge of the paper material from the carrier when the latter is in its discharge position. For this reason provision must be made for the operation of a discharge feeding finger which it is desired to have operable throughout the entire thickness of the body of paper material. To provide for these conditions, the plate 180 is formed with a lower section 190 (Fig. 19A), coplanar therewith and adjacent the bottom of the carrier, and hence in position to develop the same holding action upon the lower part of the body of paper material as the main plate 180. To properly support this lower section 190, and at the same time to provide for travel of the discharge finger through the carrier, flat U-shaped brackets 192 are provided one end of each of which is secured to the face of plate 180 and the other to plate 190, the continuous portions of the brackets extending outwardly through apertures 193 formed in the front face of the basket 160. The provision of a pair of such supporting brackets 192 has been found to give entirely satisfactory support for the lower portion 190 of the pressure plate while affording the necessary clearance for the passage of the discharge finger.

It is also desirable to provide for limiting the forward feeding movement of the paper material as it is delivered into the carrier, and this may be provided by means of a limit finger or stop 195 (Fig. 11) which may be adjustably positioned on the end 161 of the work table through the provision of a series of mounting holes 196, and wing nuts 197 which make it possible for the limit stop 195 to be located in the desired relation. The side wall of the carrier 160 is formed with apertures 198 through which the limit stop 195 projects in the forward or receiving position of the carrier so that the stop extends transversely across the pile of sheet material and in position definitely to limit the forward feeding movement thereof.

Having delivered the groups of paper material 68 toward the discharge end of the trough, it is necessary to provide for the transfer thereof from the trough into the carrier, that operation being accurately correlated in timed relation with the periods when the carrier itself is in receiving position. For this purpose an intermittent operating feeding finger 200 (Figs. 15, 17 and 18) is provided and is arranged to be capable of being projected upwardly through a slot in the rear face 116 of the trough. This upward projection occurs at the proper time in the cycle to engage a stack of sheet material which has been brought forward by one of the continuously moving fingers 132, to pick up the material therefrom, and to deliver the same forwardly into the waiting carrier. It is also necessary that such feeding finger be retracted at other times in the cycle, to permit the pile of paper material to pass through the trough above the finger 200 without obstruction.

The construction for effecting such operation is as follows. Finger 200 is formed integrally as part of an arm 201 which supports the finger for movement through slot 202 in the rear wall 116 of the trough (Figs. 17 and 18). Arm 201 is pivotally connected at point 203 with an offset bracket 204 adapted to be secured in fixed position upon a reciprocating shaft 205, the position thereof being properly set through the provision of set screw 206, that setting being such position that the finger projects just beyond the forward end of the feed table at the forward limit of its stroke. At an intermediate point in its length, arm 202 carries a guide roller 207 which has running engagement in a cam track 208 mounted beneath the rear face 116 of the trough and extending substantially normal thereto. The cam track has an intermediate centrally located plate 210 and at either end thereof a pivotally mounted switching finger 211 and 212. Finger 211 is spring urged to an upper position against the top wall of the box by means of spring 213 while finger 212 is urged against the lower wall of the box by means of spring 214.

In response to reciprocating travel of shaft 205 and arm 204, the arm 201 with its roller 207 is arranged to travel in the path indicated by the arrows and dotted lines in Fig. 17. As it moves toward the left at the beginning of a feeding stroke, the finger is lifted above the surface 116 of the trough as a result of the engagement of roller 207 with switching finger 212. The entire finger is projected and at the same time travels forwardly toward the carrier. In so doing it runs over the upwardly urged switching finger 211 which returns to the full line position after it has been cleared. Upon the return stroke, roller 207 is then guided downwardly to return over the lower path, resulting in retracting the finger below the slot as it returns to its starting position. In so doing it runs over switching finger 212 which returns to its normal full line position as shown, in preparation for the next cycle of operation. This results in raising the feeding finger 200 above the level of the wall 116 upon forward travel thereof, and the lowering of the same beneath the wall upon the rearward travel thereof. As a result the feeding finger picks up the group of paper sheets to feed the same forwardly, engaging across the rear face thereof as shown in Fig. 11, and when that forward feeding operation has been completed, it is retracted and drops beneath the surface to provide for the delivery of the subsequent pile of paper material into position for the next cycle of operation under the action of the continuous feeders 132.

In order to provide for the proper guiding and flattening of the back edges of the paper material as it passes into the carrier, a guide arm 215 (Figs. 11 and 12) in the form of a flat beveled plate is positioned immediately in advance of the carrier, being adjustably supported from the work table 161 by means of bracket 216 and adjustable rod 217. The rod also pivotally carries a lever 218 on the end of which is mounted a roller 219. The roller is located behind the sloping part of guide 215 in position to engage the paper material just prior to its delivery into the carrier and is yieldably urged into contact therewith by means of spring 219a engaging the lever 218. The paper is thus properly guided and supported without material frictional drag being created and is protected against a tendency to become misaligned under the relatively rapid forward feeding action of the finger 200. Preferably the roller 219 applies a slight pressure to assure free entry of the stack of sheets into the open end of the carrier where it is held without looseness but also substantially without pressure.

In order to provide protection for the operator and to prevent possibility of injury as a result of the movement of the basket and the delivery of the paper material thereinto, a protective guard 220 in the form of a screen is provided. The screen is mounted on brackets 221 (Fig. 11) which are rotatably carried by the shaft 163 on which the basket is pivotally mounted. The guard may be swung to its upward position as indicated in the several views in order to provide access for the adjustment or setting of the parts of the mechanism, but in its normal or operative position extends downwardly to overlie the end of the feed trough and the carrier to protect the operator against injury.

Having supplied the paper material into the carrier, the carrier then swings to its vertical or discharge position in which it is laterally offset with respect to its receiving position. As shown in Fig. 6, the carrier is in this discharge position, and its rear wall and intermediate wall 180 are in direct alignment with the clamp 62 on the turret head. The clamp is preferably opened to a slightly greater extent than the spacing of the walls of the carrier, but not to such an excessive degree as to permit slipping or falling over of any of the sheets in the stack.

In order to provide for the discharge of the paper material from the carrier and into the clamp, a second intermittently operating finger is provided. This is shown at 230 (Figs. 7, 16 and 19), in the form of a generally U-shaped arm having a forwardly projecting part 231 across which there extends at right angles the actual feeding arm 232 (Fig. 20). The front face of this arm which engages the paper material may be faced with a suitable facing of leather 233 or the like.

Arm 232 extends through a slot 234 (Fig. 7) in the rear wall of the carrier when the latter moves to its rear or discharge position and as above described preferably extends across substantially the entire width of the pile of paper material, to assure the engagement with and uniform feeding of all of the sheets thereof. As above described the U-shaped bracket 192 permits the arm to operate and in effect to sweep through the entire cross-section of the carrier, between the upper and lower sections 180, 190 of the pressure plate.

Arm 230 is attached in predetermined fixed position to a reciprocating shaft 236 which is preferably mounted in parallel relation and rearwardly of shaft 205, both such shafts being supported in spaced brackets 238 fastened to the front face of the frame 100. Arm 230 is attached to shaft 236 in such position that it projects just beyond the forward side of the transfer carriage in the forward limit of its travel. It will be noted that no adjustment in the position of either this finger 230 or of finger 200 is necessary in changing the machine for the handling of paper material of different size since both fingers maintain a definite operative relationship with respect to the forward edge of the feed table and carrier, respectively, regardless of the size of the material being handled, and therefore when a change in size is necessary, the operation of adjusting the machine is greatly simplified. Finger 232 has a simple reciprocating movement, and withdraws directly from the carrier before the latter is pivotally rocked to its forward or receiving position.

Shafts 205 and 236 are arranged to be reciprocated in definitely timed relation but in reverse phase with respect to each other. Links 239 and 240 are pivotally connected to the lower end of the bracket arms 204 and 241, respectively, the latter being fixed to shaft 236 at a suitable location. The links have pivotal connection with rock arms 242 and 243 respectively (Figs. 5 and 7). Both of such rock arms are pivotally carried by bracket 244 secured to the front face of the frame 100, the pivot points being located below the level of shaft 150.

Each arm 242 and 243 is provided at an intermediate point with a roller 246 and 247 respectively, these rollers having engagement with a cam 248 carried on drive shaft 150. This provides for actuation of each arm in one direction when the rise on the cam works against the respective roller, and return movement is accomplished with only a single cam surface through the provision of a flexible connection which is adapted to yield in the event of any obstruction occurring in the forward feed which might be such as to cause damage to the mechanism. For this purpose a flexible cable 249 is fastened at its opposite ends to the rock arms 242 and 243 by means of loops 250 passing over grooved members 251 which are carried inwardly of the rock arms on pins 252. At an intermediate point as shown in Fig. 5 the cable passes around a pulley 253 which is carried in block 254. The pulley 253 is normally urged in a direction to maintain tension in the cable 249, under the action of compression springs 255 enclosing rod 256 and working against an abutment 257 on the frame 100.

In operation, and under normal operating conditions, the rise on the cam 248 engages first one roller 246 and then the other, 247, causing rocking movement of the arms 242 and 243 respectively to the right as seen in Fig. 5. This corresponds to the return movement of the respective feeding fingers. Rearward movement of arm 242 normally causes a forward movement of arm 243, through the tension transmitted through flexible cable 249, and thus in the absence of any obstruction, the correlated and alternate forward and rearward movement of the two arms takes place in timed relation to the rotation of shaft 150. As will be clear, this provides for correlated forward feeding, first from the trough into the carrier, and then from the carrier into the clamp of the trimmer, in definite correlation with the operation of the trimmer and the operation of the carrier, all as previously described. In the event however that there is an obstruction to the forward feeding movement of either fingers 200 or 232, then the pulley 253 is allowed to move against the compressing action of spring 255, so that without disturbing the remaining parts of the mechanism, a yielding connection is provided in the drive which will prevent the occurrence of any damage to the machine on such forward stroke. Normal feeding will be immediately re-established upon removal of the obstruction, and without requiring the resetting or readjustment of the parts of the operating mechanism.

It is found highly desirable to provide such protection both for the operator and for the machine itself, in view of the substantial forces involved and the relatively hazardous nature of the trimming operation. To assure full protection, means are provided for interrupting the driving operation and applying the brake either upon the will of the operator, or upon the occurrence of a condition inherently dangerous or likely to result in damage. This is accomplished in accordance with the present invention through control of the energizing circuit for solenoid 61, suitable controls being provided through which the energizing circuit for this solenoid is maintained only provided the machine is functioning normally and in the absence of such functioning, or whenever desired by the operator to stop positively and rapidly.

Thus a manually controlled stop button 260 (Figs. 5 and 7) is positioned in a convenient location such as beneath the work table 124. It has an operating button 261 which as shown in Fig. 21 is included in the energizing circuit for solenoid 61 so that upon the opening of the switch the circuit is de-energized and the drive is terminated.

Additional controls which may be provided include a safety panel 265 (Fig. 6) mounted on pivot arms 266 adjacent the trimmer and of substantial area so that if the clamp should engage any material other than the stack of paper material, the rotation of the turret head would bring the same against the stop 265, and move the same rearwardly which is arranged to open the circuit to another switch 267, which also will de-energize the solenoid circuit. The panel 265 is also conveniently located for engagement by the operator should he be caught in any part of the mechanism. It will also be clear from Fig. 6 that the upward pivoting of the protective cover 220 to the position shown will cause it to fall back against the panel 265, moving the same to its safety position and thereby stopping the operation of the machine. When the cover 220 is returned to normal protective position, the spring restores panel 265 to its proper safety position closing switch 267 and operation may then continue.

In order to assure the automatic stoppage of the feeding operation upon the failure of the feed to proceed in the normal manner, additional electrical interlocking means are provided as follows: The shaft 150 carries a pair of contact members 270 (Figs. 5 and 6) which are each semi-circular in shape, and equally spaced from each other. They cover the greater part of the circumference but leave short, oppositely disposed, gaps. A limit switch 271 is secured to the front face of plate 100 in position to be engaged and closed when either of the cam surfaces 270 is in contact therewith. The switch is thus kept closed during the greater part of each half revolution of the shaft but is open for a short interval twice during each revolution, the periods of opening of the switch being at opposite ends of the cycle.

This switch is shown in the circuit diagram of Fig. 21 at 271, and while closed, provides for maintaining the energizing circuit for solenoid 61. A pair of by-pass switches 272 and 273 are provided which are normally held open. However, the closing of either switch 272 or 273 during the time that switch 271 is in open circuit position provides a by-pass holding circuit for the solenoid 61 so that it remains energized.

Switch 272 is shown in Fig. 15 as mounted in fixed position on bracket 238 on frame 100. An arm 276 is attached to the reciprocating shaft 205 and is so positioned on the shaft that when the shaft has traveled to its full forward position, the arm 276 engages the switch 272 to cause the closing of its contacts. This operation is timed to take place at the end of the forward feeding stroke of finger 200, and at a time when the switch 271 is in open circuit position. Hence the mechanism opens the circuit to solenoid 61 at switch 271, but if the forward feeding finger 200 has properly completed its advance stroke, and is in proper timed relationship with the remaining operation of the machine, the by-pass circuit for maintaining the solenoid energized will be completed through switch 272, and the operation of the machine will not be interrupted. Should any obstruction occur which would prevent or delay the forward travel of the finger, the circuit to the solenoid would be opened, and in the manner described above the entire drive would then be stopped and could only be reestablished by manual operation.

A second holding circuit through switch 273 is provided, this switch being mounted on arm 277 carried on frame 100. When finger 230 moves to its full forward position, the bracket 241 on shaft 236 will occupy its dotted line position as shown in Fig. 16. On its upper surface it carries an actuating plate 278 which is then moved into position to engage and close switch 273. This is timed to occur normally at the time switch 271 is opened at the opposite half of its cycle. Thus provided the forward feeding stroke of this rearward feeding finger 230 has been properly completed in the predetermined timed relation with respect to the remaining steps in the machine operation, the holding circuit for the solenoid 61 will be maintained, and the operation of the machine will continue in regular order. Switch 271 thus opens twice during each cycle under the action of cam 270, and unless first switch 272 and then switch 273 are caused to be closed at the proper points in the cycle, the holding circuit will be interrupted and the operation will stop in the manner described above. This interlocking control, therefore, assures that any improper feeding or failure to complete a feeding stroke in the proper time will result in prompt stoppage of further operation, to avoid possibility of damage to the machine and the loading up of paper material by failure to feed the same through the machine in the desired manner.

It may be found desirable to provide for the raising of the forward feeding finger, i. e., the finger which picks up the stack of sheet material from the feeding trough and advances it into the carrier, so that that finger will be moved almost immediately into its raised, fully operative position while it is moving forward relatively slowly. In this way it is made to engage the stack of sheet material gently, avoiding the shock and possible misalignment of the stack which occurs when the finger strikes the stack while traveling forward at a relatively high speed. For this purpose a modified form of mechanism is provided as shown in Figs. 22 and 23. In this construction the reciprocating shaft 300 carries arm 301 on which there is pivotally mounted the forward feeding finger 302. The finger has a roller 304 which follows in cam track 305 which is provided with two switching fingers 307 and 308 at opposite ends which are yieldably retained in their full line positions, this construction being similar to that already described.

A compression spring 310 works between arm 301 and finger 302, the spring being guided by a central pin 311 which projects downwardly through an opening in arm 301. The spring acts in a direction to urge the finger upwardly, this action being independent of the travel of the roller 304 in cam track 305. A slotted link 314 is pivotally fixed to the finger, and engages over a pin 315 which travels freely in the slot, the pin being carried on a lever 316 pivoted to arm 301. The opposite end of the lever is connected to dash pot 317 seated in arm 301. This construction provides for free and rapid lifting movement of the finger 302 by the action of spring 310 during the initial and major part of its upward travel, during which time the pin 315 travels freely in the slotted link. As the arm approaches the upward limit of its travel, however, the end of the slot engages the pin and the further travel of the finger is checked and controlled by the operation of the dash pot so that it comes smoothly to rest in its fully raised and operative position.

Roller 304 has an extended shaft on which there is mounted a flat surfaced element such as a square nut 320. Switch finger 307 has a projecting part 321 in alignment with nut 320, and under which the nut travels as the finger nears the end of its cycle of movement. Switch finger 307 cannot move upwardly beyond its broken line position as shown in Fig. 22 and in this position the projection 320 is in substantial alignment with the upper side of element 321, so that the feeding finger is held in its lowered position and prevented from being lifted by the spring 310.

A fixed pin 322 is set into the wall of the cam track 305, with its lower surface at the same level as that of projection 321, and is spaced laterally therefrom a distance less than the width of the element 320. As a result, when the element 320 completes its stroke, it engages under pin 322 before it leaves projection 321, and thus continues to be held down in its retracted position. As soon as it leaves projection 321, the switch finger 307 moves to its downward position, carrying projecting part 321 with it to a clearance position with respect to the element 320, the latter however still being retained under the fixed pin 322. Immediately upon the beginning of the succeeding stroke of forward movement, the element 320 moves outwardly from pin 322, and is then free to be raised under the action of spring 310 to its fully operative position where it projects above the feeding trough and in position to engage the stack of sheet material thereon. This occurs before any material forward velocity has been acquired, and hence the feeding finger is moving relatively slowly, and thus engages the stack without shock and without the danger of causing distortion or misalignment thereof. The remainder of the operation takes place in the manner described above.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A feeding device of the character described for the feeding of groups of sheets of paper material to a trimmer which comprises a base, a trough for receiving a group of said sheets, feeding fingers movable through said trough to feed said groups of sheets, adjustable means for supporting said trough and said feeding fingers in predetermined relation with respect to said base to vary the spacing thereof relative to an operating position of said trimmer to accommodate sheets of different size, and drive means carried by said device and movable with said trough for feeding said sheets toward and into said predetermined operative position of said trimmer.

2. A feeding device of the character described for the feeding of groups of sheets of paper material to a trimmer which comprises a base, a trough for receiving a group of said sheets, feeding fingers movable through said trough to feed said groups of sheets, adjustable means for supporting said trough and said feeding fingers in predetermined relation with respect to said base to vary the spacing thereof both horizontally and vertically relative to an operating position of said trimmer to accommodate sheets of different size, and drive means carried by said device and movable with said trough for feeding said sheets toward and into said predetermined operative position of said trimmer.

3. A feeding device of the character described for the feeding of paper sheet material to a trimmer which comprises a base, a trough for receiving said paper sheet material, adjustable means for supporting said trough in variable relation with respect to said base to vary the spacing thereof relative to a predetermined operating position of said trimmer to locate said material of different size in properly centered relation with respect thereto, drive means for operating said feed means, and variable connections for maintaining driving relations between said drive means and said feed means throughout the adjustable movement of said trough.

4. A feeding device of the character described for receiving paper sheet material of different sizes and for delivering the same in predetermined centered relation with respect to a trimmer clamp which comprises a base, a frame, adjustable means for supporting said frame in variable relation both horizontally and vertically upon said base, means carried by said frame forming a receiving station for receiving said paper sheet material in the form of stacks thereof, means on said frame for advancing said stacks forwardly from said receiving station, carrier means for receiving said stacks from said advancing means and movable to a discharge position, and means on said frame for delivering said stacks from said discharge position into said trimmer clamp in predetermined centered relation therewith.

5. In a feeding device of the character described for feeding groups of paper sheet material to a trimmer which comprises a feed trough for receiving said groups, a carrier, means for supporting said carrier adjacent the end of said trough, means for feeding said groups along said trough and into said carrier, and means for holding and confining said groups of paper sheet material against movement while in said carrier.

6. In a feeding device of the character described for feeding groups of paper sheet material to a trimmer which comprises a feed trough for receiving said groups, a carrier, pivotal means for supporting said carrier adjacent the end of said trough for swinging movement in a direction transverse thereto, means for feeding said groups along said trough and into said carrier, means for moving said carrier from its receiving position adjacent the end of said trough to a delivery position adjacent said trimmer, and means for discharging said groups from said carrier in predetermined position into said trimmer.

7. In a feeding device of the character described for feeding groups of sheets of paper material to a trimmer, the combination of a feed trough for receiving said groups, a carrier adapted to receive one of said groups, means for swingably supporting said carrier for movement between a receiving position adjacent the end of said trough and a discharge position, means for feeding said sheets in groups along said trough and sequentially into said carrier, means for confining each said group as it is delivered into said carrier, means for retaining said groups against relative movement while in said carrier, and means for discharging each of said groups of signatures from said carrier into predetermined position with respect to said trimmer.

8. In a feeding device of the character described for feeding groups of paper sheets to a trimmer, the combination of a substantially V-shaped trough for receiving said groups of said sheets, said trough having one of its faces adapted to engage the edges of said sheets formed with a plurality of spaced longitudinally extending ribs adapted to restrain creeping movement of the several sheets of a group transversely of said ribs during the passage of the group of sheets through said trough, and means for engaging the ends of said group of sheets for advancing the same in uniform relation toward one end of said trough.

9. In a feeding device of the character described for feeding sheet material in the form of groups, the combination of a feed trough having an extended receiving position affording working space for a plurality of operators and for receiving a plurality of spaced groups of said sheet material therein, spaced feed means for engaging said groups of sheet material to feed the same forwardly in said trough in predetermined spaced relation with respect to each other, a carrier positioned adjacent the end of said trough for receiving successive said groups of sheet material from said trough for delivery thereof at a remote point, and additional feeding means operable through said trough for periodically receiving a group of said sheet material from said first feed means and delivering the same directly into said carrier.

10. In a feeding device of the character described for feeding groups of sheets of paper material to a trimmer, the combination of a feed trough providing an extended receiving position for receiving a plurality of spaced groups of sheets, continuously operating said means for advancing said groups of sheets in spaced relation toward an end of said trough, a carrier for receiving the groups of sheets successively from said trough, means for movably supporting said carrier for movement between a receiving position adjacent said trough and a discharge position adjacent said trimmer, additional feed means associated with said trough and operable periodically when said carrier is in said receiving position providing for delivery of each group of sheets into said carrier, and a third feed means operable when said carrier is in its said discharge position for discharging the group of sheets therefrom into predetermined relation with respect to said trimmer.

11. In a feeding device of the character described for feeding groups of sheets of paper material, the combination of a feed trough for receiving said groups of sheets, a carrier positioned adjacent an end of said feed trough and movable between a receiving position and a discharge position, means for feeding said groups of sheets from said trough into said carrier, and an adjustable wall in said carrier providing for guiding and holding said group of sheets without relative slippage thereof while in said carrier.

12. In a feeding device of the character described for feeding groups of sheets of paper material, the combination of a feed trough for receiving said groups of sheets, a carrier positioned adjacent an end of said feed trough and movable between a receiving position and a discharge position, a guide member on said trough for progressively confining said sheets as they are fed from said trough into said carrier, and means in said carrier for holding said sheets in confined relation and preventing slipping thereof while supported therein.

13. In a feeding device of the character described for feeding groups of sheets of paper material, the combination of a feed trough for receiving said groups of sheets, a carrier positioned adjacent an end of said feed trough and movable between a receiving position and a discharge position, means for feeding said groups of sheets from said trough into said carrier, an adjustable wall in said carrier providing for guiding and holding said group of sheets while in said carrier, and feed means engageable across substantially the entire width of said group of sheets while in said carrier for discharging the same therefrom.

14. In a feeding device of the character described for feeding groups of sheets of paper material, the combination of a feed trough for receiving said groups of sheets, a carrier positioned adjacent an end of said feed trough and movable between a receiving position and a discharge position, means for feeding said groups of sheets from said trough into said carrier, an adjustable wall in said carrier providing for guiding and holding said group of sheets while in said carrier, said adjustable wall of said carrier having an off-set supporting portion providing a free passage through substantially the entire width of said carrier, and feed means including an arm adapted to extend into said off-set portion and movable through said carrier to discharge said group of sheets therefrom.

15. In a feeding device of the character described for feeding groups of sheets of paper material of varying size, the combination of a feeding trough having an extended receiving position, feed means for advancing said groups of sheets toward an end of said trough, a carrier movably positioned adjacent an end of said trough and movable from a receiving position to a discharge position, means for feeding said sheets into said carrier, and adjustable stop means adapted to extend into said carrier when in said receiving position to limit the movement of said sheets thereinto.

16. In a feeding device of the character described for feeding groups of sheets of paper material, the combination of a feeding trough mounted with its side faces at an angle to the vertical, feed means for advancing said groups of sheets toward an end of said trough, a carrier positioned adjacent an end of said trough for receiving each group of sheets successively therefrom, means for pivotally mounting said carrier for swinging movement from said receiving position where it stands at an angle corresponding to an angle of said trough to a discharge position where it stands substantially vertically to support said sheets in an upright position, means for feeding said sheets into said carrier, and means for discharging said sheets from said carrier when in said discharge position.

17. In a feeding device of the character described for feeding groups of sheets of paper material in predetermined relation to a working position, the combination of a feed trough having a receiving station for receiving said sheets, means operating continuously in said feed trough for advancing said sheets toward the end thereof, a movable carrier positioned at the end of said trough and movable from a receiving to a discharge position, additional feed means periodically engageable with said sheets which have been advanced toward said trough and for delivery thereof into said carrier, further feed means positioned adjacent the discharge position of said carrier for discharging said sheets from said carrier into said predetermined working position, and means for operating said carrier, said additional feed means and said further feed means in correlated relation with each other.

18. In a feeding device of the character described for feeding groups of sheets of paper material to a trimmer, the combination of a feed trough having an elongated receiving station for receiving said sheets, a carrier mounted adjacent an end of said feed trough for movement in a plane transverse thereto between a receiving and discharge position, a first feed means for feeding said sheets into said carrier, means for moving said carrier in said transverse plane to said discharge position, and a second feed means arranged in substantially parallel relation with said first feed means for discharging said sheets from said carrier into said trimmer.

19. In a feeding device of the character described for feeding groups of sheets of paper material to a trimmer, the combination of a feed trough having an elongated receiving station for receiving said sheets, a carrier mounted adjacent an end of said feed trough for movement in a plane transverse thereto between receiving and discharge positions, a first feed means for feeding said sheets into said carrier, and a second feed means arranged substantially parallel with said first feed means and engageable with said sheets in the discharge position of said carrier for delivery thereof from said carrier to the trimmer forwardly in the same direction of movement as produced by said first feed means but laterally displaced relatively thereto.

20. In a feeding device of the character described for feeding groups of sheets of paper material to a trimmer, the combination of a feeding trough adapted to receive said sheets, a carrier supported for movement between a receiving positioin adjacent said trough and a discharge position adjacent the trimmer, a first feeding means for delivering said sheets from said trough into said carrier, a second feeding means for delivering said sheets from said carrier to said trimmer, and actuating means for said first and second feed means including a yieldable driving connection adapted to yield upon the occurrence of an obstruction to the feeding of said sheets.

21. In a feeding device of the character described for feeding groups of sheets of paper material to a trimmer, the combination of a feeding trough adapted to receive said sheets, a carrier supported for movement between a receiving position adjacent said trough and a discharge position adjacent said trimmer, a first feeding means for delivering said sheets from said trough into said carrier, a second feeding means for delivering said sheets from said carrier to said trimmer, means for actuating said feed means in correlated relation with each other including a cam, spaced followers engageable with said cam and connected respectively with said feed means, and a flexible connection between said followers to cause actuation of each one thereof on its working stroke through engagement of said cam with the other one thereof.

22. In a feeding device of the character described, the combination of a feed trough having a receiving station for receiving sheet material, a carrier movably mounted adjacent an end of said feed trough for receiving said sheets, feed means movable through an opening in said trough and engageable with said sheets of delivery thereof from said trough into said carrier, and means for causing said feed means periodically to project upwardly through said trough opening while traveling forward on a working stroke followed by the return movement thereof in an inoperative position below said trough.

23. In a feeding device of the character described, the combination of a feed trough having a receiving station for receiving sheet material, a carrier movably mounted adjacent an end of said feed trough for receiving said sheet material, a feeding finger adapted to be projected upwardly through an opening in said trough to cause the forward feeding of said sheet material into said carrier, a reciprocating member for driving said feeding finger, and a guide track for effecting the upward projection of said finger through said slot on its forward feeding stroke and its withdrawal thereof below said trough upon its return stroke.

24. In a feeding device of the character described for feeding work material in sheet form the combination of a feed table adapted to receive said work material to be fed toward a working position, feed means operable through a predetermined stroke for advancing said work material forwardly, drive means for said feed means, and means responsive to the completion of each advancing stroke of movement of said feed means, and means controlled by said responsive means for terminating the action of said drive means upon failure of said feed means to complete any advancing stroke of movement.

25. In a feeding device of the character described for feeding groups of work material in sheet form toward a working position, the combination of a feed trough adapted to receive groups of said work material, a carrier movable between a receiving position adjacent an end of said trough and a discharge position spaced therefrom, a plurality of feed means providing for the feeding of said groups of work material from said trough into said carrier and for delivering said groups of material from said carrier, common drive means for actuating said feed means, and means responsive to failure of either of said feed means to complete a working stroke for interrupting the driving action of said driving means.

26. In a feeding device of the character described for feeding groups of work material in sheet form toward a working position, the combination of a feed trough adapted to receive groups of said work material, a carrier movable between a receiving position adjacent an end of said trough and a discharge position spaced therefrom, a plurality of feed means providing for the feeding of said groups of work material from said trough into said carrier and for delivering said groups of material from said carrier, common drive means for actuating said feed means, and means responsive to the blocking of either of said feed means for terminating the action of said drive means to prevent damage to said machine.

27. In a device for feeding stacks of sheet material or the like, a feed trough for receiving individual stacks of sheet material, a feeding finger for engaging one side of a stack of said sheet material to feed the same forwardly, means for producing a reciprocating movement of said feeding finger to advance the sheet material forwardly through the trough, means for retracting said feeding finger during reverse travel thereof, and means providing for substantially complete upward travel of said feeding finger into its fully operative position in said trough at the beginning of a forward feeding stroke thereof.

28. In a device for feeding stacks of sheet material or the like, a feed trough for receiving individual stacks of sheet material, a feeding finger having an operative position for engaging one side of said sheet material to feed the same forwardly on a working stroke, a reciprocating member, a cam track for controlling the retracting movement of said feeding finger in coordinated relation with the reciprocating travel thereof, resilient means normally tending to raise said finger into its operative position, and means associated with said cam track for retaining said finger in retracted position until the beginning of a forward stroke of movement thereof and for promptly releasing said finger to provide for actuation thereof to the fully raised position upon the beginning of said working stroke.

WILLIAM R. SPILLER.
EDWIN W. BRADMILLER.

REFERENCES CITED

The following references are of record in the file of this patent:

UNITED STATES PATENTS

| Number | Name | Date |
|---|---|---|
| 1,118,152 | Rowe | Nov. 24, 1914 |
| 1,213,265 | Rowe | Jan. 23, 1917 |
| 1,813,598 | Ackley | July 7, 1931 |
| 1,930,075 | Bentley | Oct. 10, 1933 |
| 1,953,067 | Ballard | Apr. 3, 1934 |
| 2,017,462 | Kleinberg | Oct. 15, 1935 |
| 2,324,531 | Nordquist | July 20, 1943 |
| 2,344,667 | Arelt | Mar. 21, 1944 |

Certificate of Correction

December 26, 1950

Patent No. 2,535,240

WILLIAM R. SPILLER ET AL.

It is hereby certified that error appears in the printed specification of the above numbered patent requiring correction as follows:

Column 2, line 36, for "Figs. 7A and 7B are broken detail views in end" read *Fig. 7 is a vertical sectional view through the*; and that the said Letters Patent should be read as corrected above, so that the same may conform to the record of the case in the Patent Office.

Signed and sealed this 17th day of April, A. D. 1951.

[SEAL]

THOMAS F. MURPHY,
*Assistant Commissioner of Patents.*